No. 631,036. Patented Aug. 15, 1899.
G. M. CRUMP.
REVERSIBLE CHECK VALVE.
(Application filed Feb. 4, 1899.)

(No Model.)

Witnesses:
George Barry Jr
Edward Vieser

Inventor:
George M. Crump
by attorneys
Brown & Seward

THE NORRIS PETERS CO., PHOTO-LITHO., WASHINGTON, D. C.

UNITED STATES PATENT OFFICE.

GEORGE M. CRUMP, OF COHOES, NEW YORK.

REVERSIBLE CHECK-VALVE.

SPECIFICATION forming part of Letters Patent No. 631,036, dated August 15, 1899.

Application filed February 4, 1899. Serial No. 704,497. (No model.)

*To all whom it may concern:*

Be it known that I, GEORGE M. CRUMP, a citizen of the United States, and a resident of Cohoes, in the county of Albany and State of New York, have invented a new and useful Improvement in Reversible Check-Valves, of which the following is a specification.

The object of my invention is to provide a simple check-valve which may work in any direction and which is easily reversible without removing its box or casing from its connections.

I will first describe with reference to the accompanying drawings a valve embodying my invention and will afterward point out its novelty in the claim.

Figure 1:
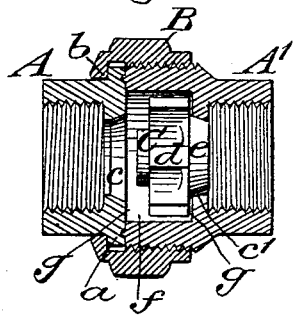
Figure 3:
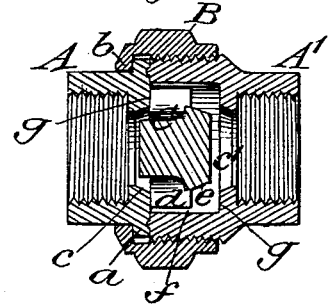
Figure 2:
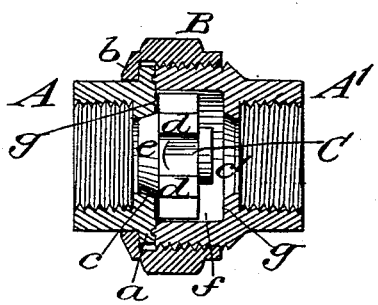
Figure 4:
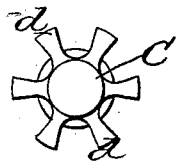

Figure 1 represents a central section of the valve-casing and a side view of the valve therein, the latter being closed in its right-hand seat; Fig. 2, a similar view, except that the valve is reversed, closing in its left-hand seat. Fig. 3 corresponds with Fig. 1, except that the valve is shown in section and open. Fig. 4 represents a back view of the valve apart from the casing.

Similar letters of reference designate corresponding parts in all the figures.

The valve-casing is represented as composed of two separable members A A' and a connecting-nut B, such as are common in what are known as "union" pipe-couplings, the member A having an external flange $a$, which is engaged by the corresponding internal flange $b$ of the nut, and the member A' being externally screw-threaded to receive the internal screw-thread of the nut.

In the member A of the casing there is a conical valve-seat $c$, and the member A' has a similar valve-seat $c'$, the said seats facing each other. The valve proper, C, consists of a disk having a conical face $e$, which fits either of the two seats $c\ c'$ and having wings $d$, which fit loosely within the inner bore $f$ of the mouth of the member A' of the casing for the purpose of guiding the valve to either seat, according to the direction in which its face $e$ is placed.

The seats $c\ c'$ have provided around them annular stop-shoulders $g$, against one of which the backs of the valve-wings $d$ are arrested to maintain the valve when open in proper position to allow free passage for water or other fluid through the spaces between the wings $d$.

To reverse the valve, it is not necessary to disconnect the valve-casing from the pipes or other connections in which it is placed, but only to unscrew the nut from the member A' and separate the two members far enough to permit the removal of the valve, which is then merely turned around before again bringing the two members together, and replacing and screwing up the nut on the member A'.

What I claim as my invention is—

The combination of a valve-casing comprising two separable members in each of which is one of two valve-seats which face each other and a shoulder surrounding said seat, and a winged disk valve reversible between said seats, the said shoulders constituting stops to the wings of the valve for arresting the valve in either direction in open condition, substantially as herein described.

In testimony that I claim the foregoing as my invention I have signed my name, in presence of two witnesses, this 28th day of January, 1899.

GEORGE M. CRUMP.

Witnesses:
 JOHN STANWAY,
 WILLIAM SELOFF.